Oct. 7, 1958  R. W. AYLING  2,855,253
FABRICATED PISTON
Filed July 1, 1955

*INVENTOR.*
ROBERT W. AYLING
BY *Herman Seid*
ATTORNEY

United States Patent Office 2,855,253
Patented Oct. 7, 1958

2,855,253

FABRICATED PISTON

Robert W. Ayling, Syracuse, N. Y., assignor to Carrier Corporation, Syracuse, N. Y., a corporation of Delaware Application July 1, 1955, Serial No. 519,498

5 Claims. (Cl. 309—14)

This invention relates to a fabricated piston for use in reciprocating machinery such as a reciprocating refrigerant compressor and to a method of making the piston.

Heretofore, pistons for use in reciprocating refrigerant compressors and similar devices have generally been cast resulting in pistons that are heavy and expensive. Further, to assemble a wrist pin into a conventional piston requires a transverse hole which interrupts the sealing surface. To eliminate these disadvantages, it has been proposed to provide fabricated pistons usually consisting of a piston shell and a wrist pin carrier attached to the piston shell by welding, brazing, riveting or bolting. These methods of attachment are undesirable and unsatisfactory in use. Welding and brazing are unsatisfactory because the heat involved tends to distort the members; riveting and brazing require drilling holes in the piston shell which in effect provide potential leakage points when the piston is in use.

The chief object of the present invention is to provide a fabricated piston so constructed that the defects of prior constructions are obviated.

Another object of the invention is to provide a light weight inexpensive piston adapted to be easily and readily assembled to assure accurate alignment between the parts thereof and the eccentric strap.

A further object is to provide a method of fabricating the piston. Other objects of the invention will be readily perceived from the following description.

This invention relates to a piston construction for a compressor comprising a piston shell and a wrist pin carrier. The piston shell comprises a cylindrical skirt portion having a cover or top member. The wrist pin carrier may be formed from a cylindrical section of tubing, one end of the section being flared outwardly; crossholes are formed in the body of the section to receive the ends of a wrist pin. Preferably, the body of the carrier comprises opposite lugs extending from the flared portion, the cross holes being placed in the lugs, so that ready access is provided to the members of the assembly contained therein. On assembly the wrist pin carrier is fully enveloped in the piston shell and the lip of the piston shell is then swaged or spun inwardly so as to be in contact with the flared end of the wrist pin carrier. Thus, the swaged lip of the piston shell is in an abutting relationship with the carrier while the cover of the piston shell and the ends of the carrier lugs are also in an abutting relation, thereby assuring a firmly locked assembly.

This invention also relates to a method of forming a fabricated piston. In assembling the piston, the end of an eccentric strap is inserted into the wrist pin carrier and a wrist pin forced through the openings in the carrier and strap to secure the two elements as a unit. This assembly of the eccentric strap, wrist pin and wrist pin carrier is inserted into a drawn piston shell having an internal diameter equal to, or slightly greater than the outside diameter of the flared section of the wrist pin carrier. After insertion of this assembly into the piston shell, the open end of the piston shell is spun or swaged inwardly forming a lip which locks the wrist pin carrier in its inserted position.

The attached drawings illustrate a preferred embodiment of the invention in which.

Figure 1:
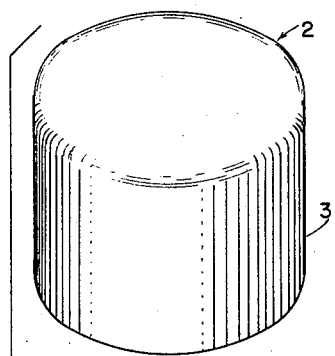
Figure 1 is an exploded perspective view of the fabricated piston with the eccentric strap, wrist pin and wrist pin carrier assembly separate from the piston shell.
Figure 1:
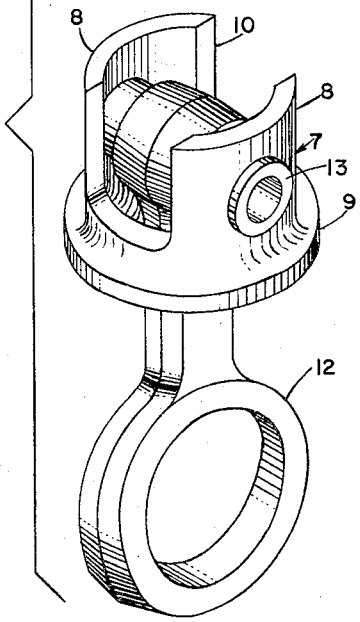

Referring to the drawing, and particularly Figure 1, there is shown an exploded view of the elements of the fabricated piston of the present invention. The piston comprises a shell 2, a wrist pin carrier 7, a wrist pin 13 and an eccentric strap 12.

Figure 2:
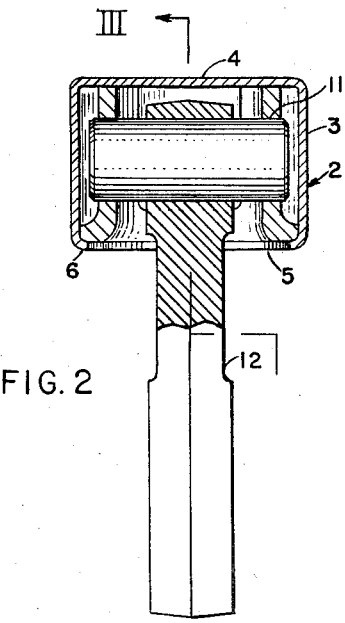
Figure 2 is a view partly in elevation and partly in section of the fabricated piston.
Figure 3:
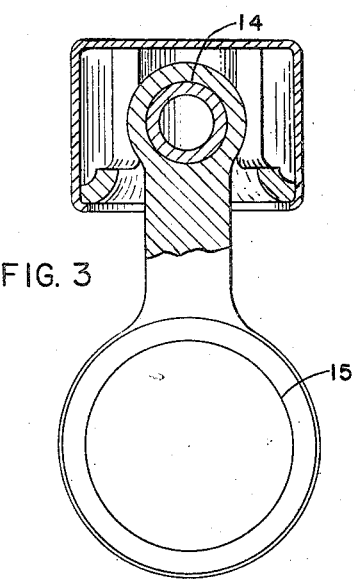
Figure 3 is a view partly in elevation and partly in section taken along the line III—III of Figure 2.

Shell 2 is of a general cup shape; that is, it includes a cylindrical skirt 3 having cover 4, the other end being open as shown at 5. This piston shell is of a light construction having a sheet metal wall thickness and may be fabricated by drawing or extruding operations. Referring to Figures 2 and 3, it will be noted that the skirt 3 terminates in a rim portion which is subsequently swaged or spun inwardly as hereinafter described to form a lip 6.

The wrist pin carrier 7 is of a generally cylindrical shape and may be fabricated from a section of tubing. One end of the section is flared outwardly as at 9 while the body of the carrier, preferably, comprises opposite lugs 8 to reduce the weight of the assembly. If desired, of course, the body may be formed as a solid wall of tubing. The outside diameter of the flared end 9 is equal to or slightly smaller than the inside diameter of the piston shell 2. The lugs 8 may be formed by providing two cuts 10 in the body of the carrier. Holes 11 are provided in the lugs to receive the end of the wrist pin 13.

Referring to Figure 1, the attachment of the eccentric strap 12 by means of the wrist pin 13 to the wrist pin carrier 7 is shown. It will be noted that the wrist pin 13 is hollow to aid in the attainment of a light weight construction. In Figures 2 and 3, there is shown the final orientation of the wrist pin carrier 7 after it has been inserted into the piston shell 2. The swaged lip 6 and the flared end 9 are in an abutting arrangement while the cover 4 of the piston shell and the ends of the lugs 8 of the wrist pin carrier are also in an abutting relationship. The wrist pin carrier is fully enveloped and locked securely within the piston shell.

In assembling the fabricated piston, the eccentric strap 12 is inserted through the flared end 9 of the carrier 7 so that its bearing surface 14 is concentric with the pin holes 11 in lugs 8. The wrist pin 13 is then pressed or forced through the aligned eccentric strap bearing hole 14 and cross holes 11. With this construction, it can be seen that the wrist pin is fixed to the wrist pin carrier and the eccentric strap is rotatably mounted on the wrist pin.

The carrier-strap assembly is then inserted into the piston shell 2 so that the ends of lugs 8 abut against the cover 4 of the piston shell 2. The entire assembly is then placed in a suitable jig and the lower rim portion of the piston shell swaged or spun inwardly so that a lip 6 is formed which is in an abutting relationship with the flared end 9. Since the lugs 8 are also in a similar abutting arrangement, the wrist pin carrier is firmly locked within the piston shell.

This method of fabrication and attachment avoids the use of high temperatures which distort the shell and obviates the need for drilling holes for bolting or riveting means.

The invention provides a piston construction that is light in weight and avoids the harmful effects of fastening means heretofore utilized to attach the elements together. The invention also permits the use of metals or combinations of metals in a piston not now used because they do not lend themselves readily to welding, brazing or casting. The construction permits high wrist pin location and a fully enveloped wrist pin thereby providing an extended and uninterrupted sealing surface along the cylindrical portion of the piston.

While I have described a preferred embodiment of the invention, it will be understood the invention is not limited thereto since it may be otherwise embodied within the scope of the following claims.

I claim:

1. A piston for a compressor comprising a shell having a cup shape, said shell including abutment means integrally associated therewith and a cylindrical pin carrier being placed in said shell, said pin carrier being made of tubing and having one end flared outwardly, said abutment means cooperating with the flared end to retain the pin carrier within the shell.

2. A piston for a compressor comprising a cylindrical shell including a skirt and a cover, the terminal portion of the skirt being bent inwardly, a cylindrical pin carrier, said carrier having an outwardly flared portion and lug members to receive a pin member, said pin carrier being enveloped by said shell with the inwardly bent portion of the skirt in an abutting relationship with the flared portion of said pin carrier.

3. A piston according to claim 2 in which the end of the pin carrier abuts against the cover of the shell.

4. A piston for a compressor comprising a shell including a skirt and a cover, a pin carrier having a flared portion and oppositely disposed pin retaining lugs extending therefrom; said pin carrier being enveloped by said shell; said shell including abutment means to retain the pin carrier within said shell by coacting with the flared portion of said pin carrier.

5. A piston according to claim 4 in which said abutment means comprises an inwardly extending lip formed along the terminal portion of the skirt.

References Cited in the file of this patent

UNITED STATES PATENTS

| | | |
|---|---|---|
| 2,093,594 | Wild et al. | Sept. 21, 1937 |
| 2,165,619 | Doeg | July 11, 1939 |
| 2,198,623 | Kastler | Apr. 30, 1940 |
| 2,671,704 | Brown | Mar. 9, 1954 |